United States Patent
Yamamoto et al.

(10) Patent No.: US 8,235,457 B2
(45) Date of Patent: Aug. 7, 2012

(54) CABIN AND TRAVELING CONSTRUCTION MACHINE WITH THE SAME

(75) Inventors: Keiji Yamamoto, Hiroshima (JP); Yoshiaki Murakami, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 201 days.

(21) Appl. No.: 12/506,514

(22) Filed: Jul. 21, 2009

(65) Prior Publication Data
US 2010/0032985 A1  Feb. 11, 2010

(30) Foreign Application Priority Data

Aug. 11, 2008 (JP) ................................. 2008-207091

(51) Int. Cl.
*B62D 33/06* (2006.01)
(52) U.S. Cl. .............................. 296/190.03; 296/190.08
(58) Field of Classification Search ............ 296/190.01, 296/190.08, 193.06, 193.12, 187.12, 187.13, 296/203.01, 203.03, 205, 190.03, 29, 30; 180/89.12; 280/756, 796, 797, 798; *B62D 33/06*
See application file for complete search history.

(56) References Cited

U.S. PATENT DOCUMENTS

| | | | | |
|---|---|---|---|---|
| 2,389,907 A * | 11/1945 | Helmuth | .................. | 296/203.01 |
| 4,650,242 A * | 3/1987 | Obe et al. | .................. | 296/190.08 |
| 6,409,254 B2 * | 6/2002 | Tiziano | .................... | 296/190.08 |
| 6,582,010 B2 * | 6/2003 | Sakyo et al. | ............. | 296/190.08 |
| 7,048,082 B2 * | 5/2006 | Mori et al. | .................. | 180/89.12 |
| 2006/0017308 A1 * | 1/2006 | Kojima et al. | ........... | 296/190.03 |
| 2007/0085380 A1 * | 4/2007 | Murakami et al. | ....... | 296/190.08 |

FOREIGN PATENT DOCUMENTS

| | | |
|---|---|---|
| EP | 1 775 202 A2 | 4/2007 |
| EP | 1 775 202 A3 | 4/2007 |
| FR | 2 914 332 | 10/2008 |
| JP | 2001-182098 | 7/2001 |
| JP | 2002-115268 | 4/2002 |
| JP | 2004-345486 | 12/2004 |
| JP | 2006-2540 | 1/2006 |
| JP | 2006-240568 | 9/2006 |
| JP | 2009-137370 | 6/2009 |

* cited by examiner

*Primary Examiner* — Dennis Pedder
*Assistant Examiner* — Sunsurraye Westbrook
(74) *Attorney, Agent, or Firm* — Oblon, Spivak, McClelland, Maier & Neustadt, L.L.P.

(57) ABSTRACT

A rear beam has a first beam with right and left ends welded to right and left rear supports and a second beam welded to a front surface of the first beam along the right and left direction. The second beam is welded to the first beam so that an upper end portion of the second beam is above an upper end portion of the first beam and a lower end portion of the second beam is above a lower end portion of the first beam.

6 Claims, 7 Drawing Sheets

CABIN AND TRAVELING CONSTRUCTION MACHINE WITH THE SAME

BACKGROUND OF THE INVENTION

1. Field of the Invention

The present invention relates to a cabin and a traveling construction machine with the same.

2. Description of the Related Art

Figure 7:
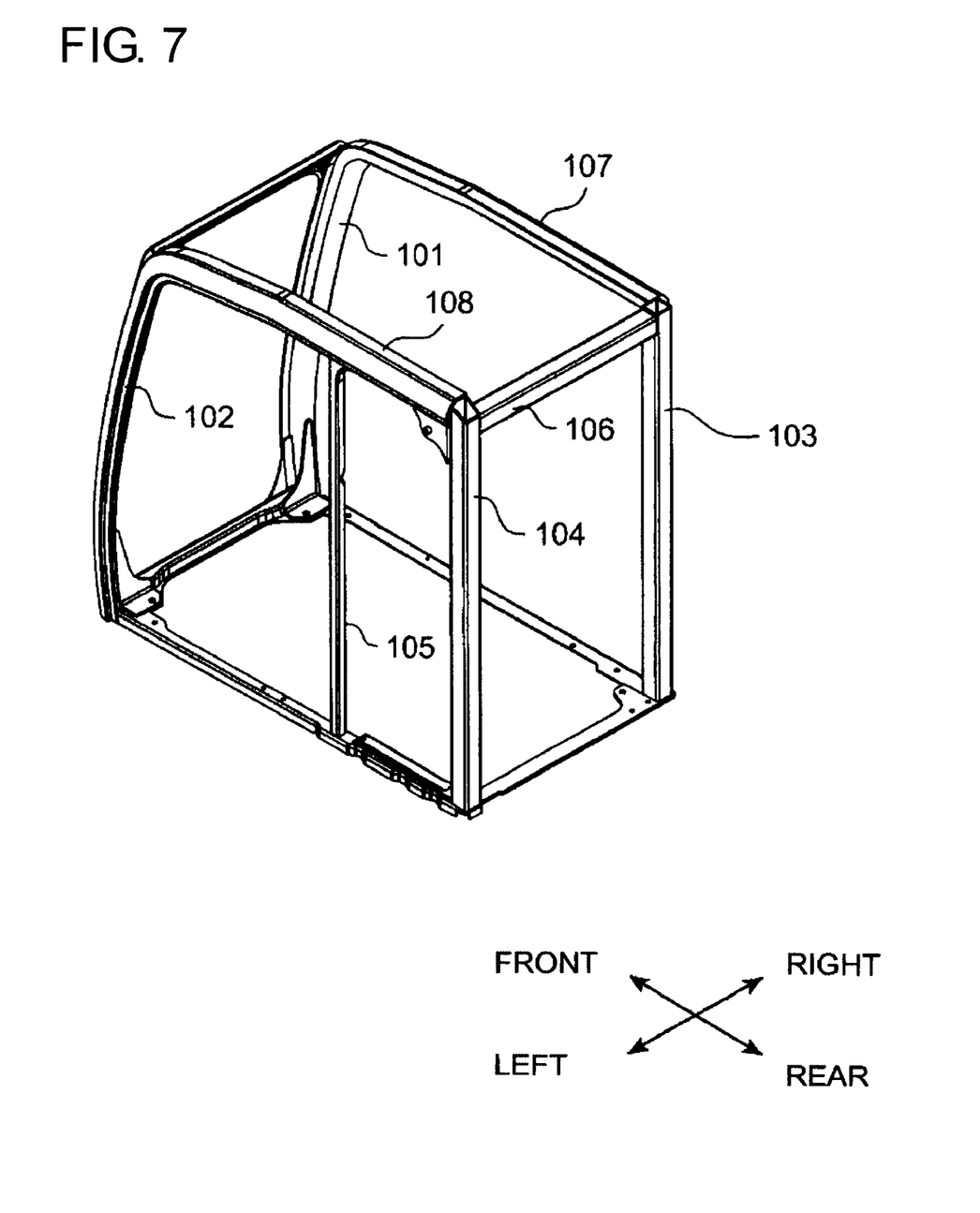
FIG. 7 is a perspective view showing a frame structure of a conventional cabin of a traveling construction machine.

For example, there is a known traveling construction machine having a cabin which is provided for an upper body mounted on a lower self-traveling body in which an operator's cab is formed. FIG. 7 is a perspective view showing a frame structure of a conventional cabin of a traveling construction machine.

As in FIG. 7, the cabin is provided with the frame structure including a plurality of supports disposed on a base frame of an upper body and beams for coupling the above supports. Specifically, the cabin is provided with a right front support 101 and a left front support 102 both disposed so as to be apart from each other in the right and left direction in a front part, a right rear support 103 and a left rear support 104 both disposed so as to be apart from each other in the right and left direction in a rear part, a rear beam 106 for coupling upper parts of the right and left rear supports 103 and 104 in the right and left direction, and an intermediate support 105 disposed between the left front support 102 and the left rear support 104. Upper parts of the right and left front supports 101 and 102 and the upper parts of the right and left rear supports 103 and 104 are coupled to each other by right and left beams 107 and 108.

Such kind of cabin is to require sufficient strength for the purpose of protection of an operator at the time of a fall. Specifically, the cabin is to require strength capable of to some extent suppressing narrowing of space in an operator's cab surrounded by the supports 101 to 105 and the beams 106 to 108 when the cabin receives a load directed from the left side to the right side, a load directed from the rear side to the front side and a load directed from the upper side to the lower side.

With regard to such requirement, for example in Japanese Patent Laid-Open No. 2006-2540 (Patent Document 1), parts corresponding to rear parts of the right and left beams 107 and 108 are respectively replaced by solid coupling members and a plurality of lateral beam members extending in the right and left direction with both ends joined to the right and left coupling members by welding are added instead of a configuration corresponding to the rear beam 106.

The rear beam 106 shown in FIG. 7 and the lateral beam members disclosed in Patent Document 1 play an important role as a strengthening member for connecting the right and left supports (101 to 105 in FIG. 7) respectively so as function in the direction to prevent narrowing of a distance between the right and left supports when the cabin receives the loads.

However, as in Patent Document 1, in the case where a plurality of the lateral beam members are arranged so as to be apart from each other in the front and rear direction, it is not possible to improve respective bending strength of the lateral beam members.

Furthermore, in Patent Document 1, there is a need for providing a pair of the right and left solid coupling members coupled to the lateral beam members so that the lateral beam members arranged so as to be apart from each other in the front and rear direction effectively function. Therefore, there is a problem of increasing wastefully weight of a machine body.

SUMMARY OF THE INVENTION

An object of the present invention is to provide a cabin capable of suppressing narrowing of space in the cabin by improving bending strength of a rear beam itself while suppressing an increase in weight, and a traveling construction machine with the same.

The present invention is a cabin provided for a base frame of an upper body mounted on a lower self-traveling body of a construction machine, comprising a pair of right and left front supports disposed on the base frame, a right rear support disposed in the rear of the right front support on the base frame, a left rear support disposed in the rear of the left front support on the base frame, a right beam for coupling an upper part of the right front support and an upper part of the right rear support, a left beam for coupling an upper part of the left front support and an upper part of the left rear support, and a rear beam for coupling the upper parts of the right and left rear supports. Further, the rear beam has a first beam with right and left ends welded to the right and left rear supports respectively and a second beam welded to a front surface of the first beam along the right and left direction, and the second beam is welded to the first beam so that an upper end portion of the second beam is above an upper end portion of the first beam and a lower end portion of the second beam is above a lower end portion of the first beam.

In such a case, in a state that the second beam is shifted to above the first beam, the second beam is welded to the front surface of the first beam. Therefore, it is possible to improve the bending strength in the up and down direction and the front and rear direction of the rear beam while suppressing the increase in the weight of the entire rear beam. A reason thereof is as follows. It is thought that for example a sectional area of the rear beam perpendicular to the right and left direction is increased evenly (while maintaining a shape thereof to be similar) as means for improving the bending strength of the rear beam. However, in such a case, a sectional area of the rear beam for an excessive part which does not contribute to the bending strength in the up and down direction and the front and rear direction is also increased. Therefore, the weight of the rear beam is excessively increased. Meanwhile, in the present invention, the second beam is welded to the front side of the first beam to lengthen the section of the rear beam in the front and rear direction, while the second beam is shifted to and arranged above the first beam to lengthen the section of the rear beam in the up and down direction. Consequently, it is possible to improve the bending strength of the rear beam in the up and down direction and the front and rear direction without wastefully increasing the weight of the rear beam.

As a result, by improving the bending strength of the rear beam itself while suppressing the increase in the weight, it is possible to suppress the narrowing of the space in an operator's cab.

In the present invention, since the second beam is directly welded to the first beam for coupling the right and left rear supports to each other, loads imposed on the right and left rear supports can be received by both the first beam and the second beam. Therefore, it is possible to enhance the entire cabin without a specific member for coupling the first beam and the second beam in the front and rear direction (a solid coupling member in Patent Document 1). By omitting the specific member as described above, it is also possible to suppress the increase in the weight of the cabin.

Further, in the present invention, since the lower end portion of the second beam arranged at the front of the first beam is arranged above the lower end portion of the first beam, it is possible to suppress that the second beam gets into sight of an operator in the cabin when the operator looks at the rear side. Therefore, it is possible to enhance the cabin while maintaining favorable sight to the rear side.

That is, an upward sight line to the rear side of the operator positioned below the first beam has an upward inclination toward the rear side, and an upper limit of the sight line is regulated by the lower end portion of the first beam. However, in the present invention, the second beam is provided at the front and at the same time above the first beam. Therefore, the second beam is arranged at a position above the sight line of the operator, and hence the second beam does not get into the sight of the operator. Consequently, according to the present invention, it is possible to enhance the cabin while maintaining the favorable sight to the rear side.

In the cabin of the traveling construction machine, preferably, at least one of right and left ends of the second beam is welded to the rear support arranged at a side position corresponding to the at least one end.

In such a case, since the load imposed on any of the right and left rear supports can be directly received by the second beam, the load can be surely received by both the first beam and the second beam.

In the cabin, preferably, at least one of the right and left rear supports is provided with a first support welded to the end of the first beam and a second support welded to a front surface of the first support along the up and down direction, at least one of the right and left ends of the first beam is welded to an upper part of the first support, and at least one of the right and left ends of the second beam is welded to an upper part of the second support.

In such a case, the rear support is formed by welding the second support to the front surface of the first support. Therefore, when the entire cabin is inclined in the front and rear direction, the above rear support effectively functions in the direction so as to prevent such inclination. When the load in the right and left direction is imposed on the cabin, the above load can be surely received by the first beam welded to the first support and the second beam welded to the second support.

In the cabin, preferably, sections of the first beam and the second beam, the sections being perpendicular to the right and left direction, are respectively formed into a quadrilateral, and the first beam and the second beam are welded to each other in a state that a forward flat surface of the first beam and a rearward flat surface of the second beam are closely adhered to each other.

In such a case, the first beam and the second beam can be welded to each other in a state that the flat surfaces forming quadrilaterals are closely adhered to each other. Therefore, it is possible to sufficiently ensure welding strength and accordingly, sufficiently ensure the bending strength of the entire rear beam as well.

In the cabin, preferably, the first beam and the second beam are respectively formed by a tubular member extending in the right and left direction.

In such a case, hollow tubular members are adopted as the first beam and the second beam so as to reduce the weight, and also improve the strength of the rear beam more than the case where a tubular member only with a large section is adopted as the entire rear beam. That is, unlike the tubular rear beam having an outside dimension corresponding to the section of the rear beam after welding the first beam and the second beam according to the present invention, since the rear beam in which two tubular members of the first beam and the second beam are welded to each other as in the present invention has a wall in an intermediate part thereof (a welding part), it is possible to realize the rear beam with high strength.

In the cabin, preferably, length in the right and left direction and a section perpendicular to the right and left direction of the first beam are respectively set to be the same as length in the right and left direction and a section perpendicular to the right and left direction of the second beam.

In such a case, since the same member can be used as the first beam and the second beam, common parts can be used.

The present invention is a traveling construction machine, comprising a lower self-traveling body, and an upper body provided on the lower traveling body. Since the cabin is provided in the upper body, it is possible to provide the traveling construction machine.

DESCRIPTION OF THE PREFERRED EMBODIMENTS

Hereinafter, a description will be given to a preferred embodiment of the present invention with reference to the drawings.

Figure 1:
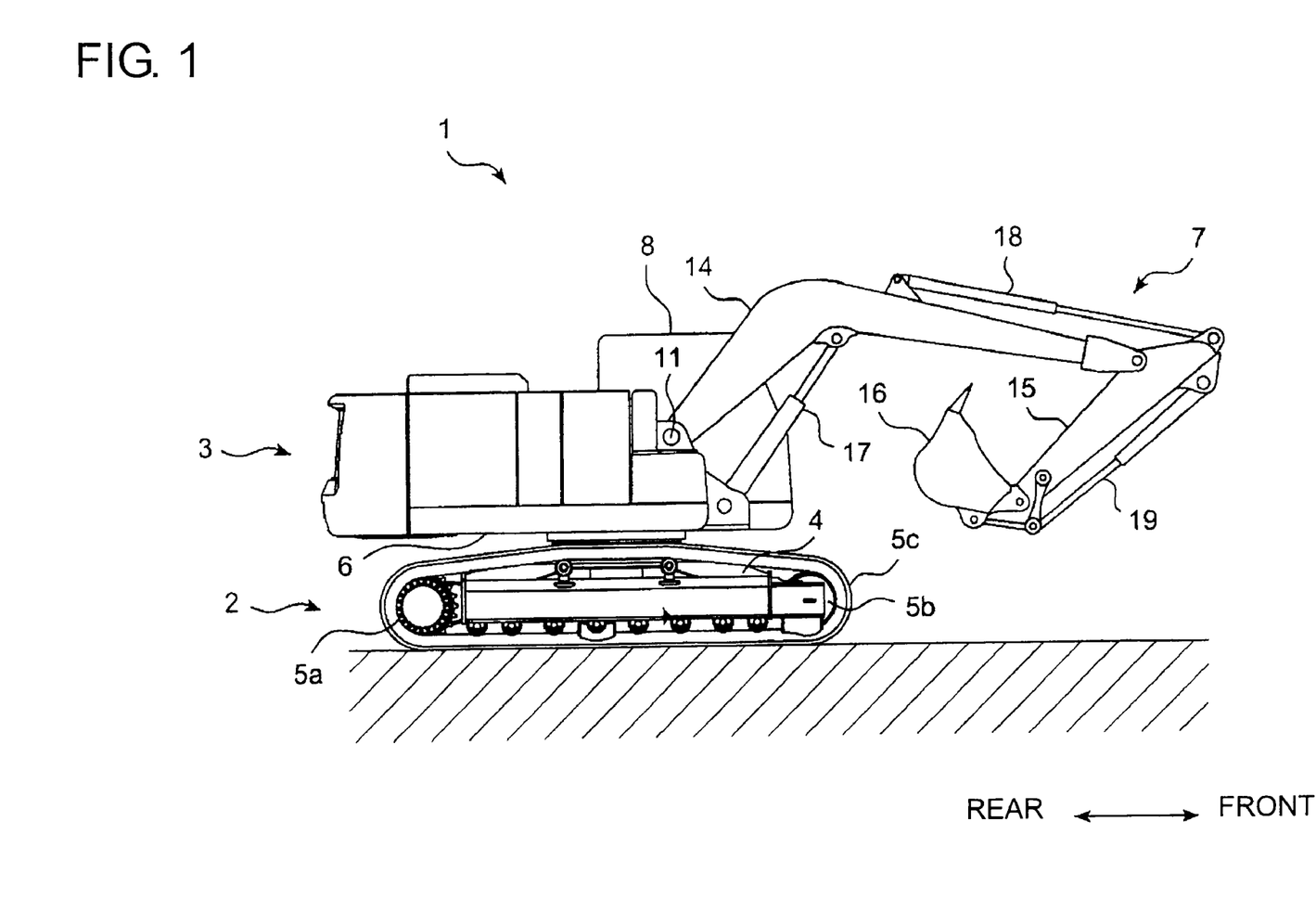
FIG. 1 is a side view showing the entire configuration of a hydraulic excavator according to an embodiment of the present invention.

FIG. 1 is a side view showing the entire configuration of a hydraulic excavator according to the embodiment of the present invention.

With reference to FIG. 1, a hydraulic excavator 1 serving as an example of a construction machine is provided with a crawler type lower traveling body 2 and an upper rotating body 3 rotatably mounted on the above lower traveling body 2.

The lower traveling body 2 is provided with a lower frame 4, and a pair of crawlers 5 (one of the crawlers is shown in FIG. 1) mounted on the both sides of the above lower frame 4. The crawler 5 is provided with a drive wheel 5a, an idle wheel 5b and a crawler belt 5c wound around the above wheels 5a and 5b. The crawler 5 is to travel in accordance with a circulation action of the crawler belt 5c.

Figure 2:
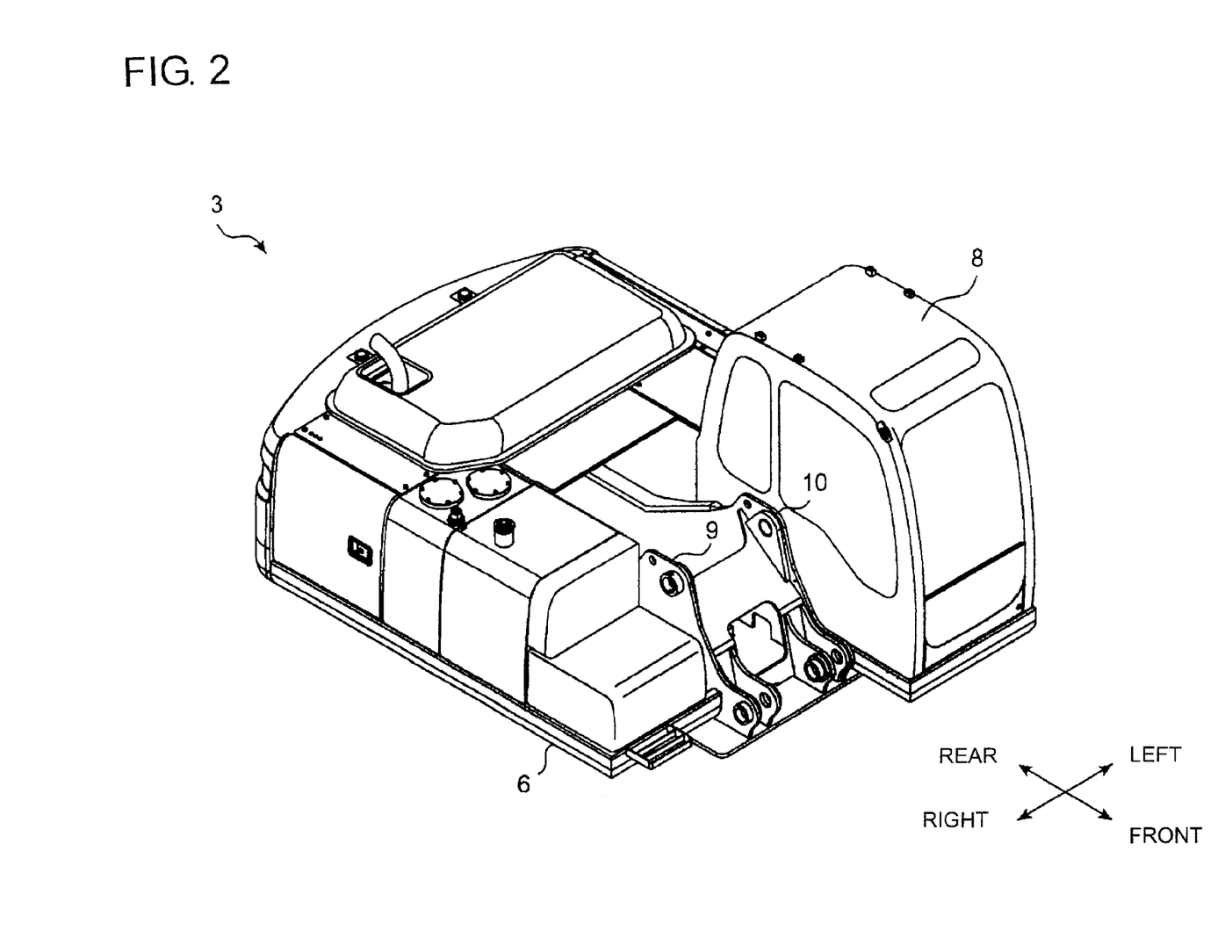
FIG. 2 is an enlarged perspective view showing an upper rotating body of the hydraulic excavator of FIG. 1.

FIG. 2 is an enlarged perspective view showing the upper rotating body 3 of the hydraulic excavator 1 of FIG. 1. It should be noted that in the following description, the front and rear direction and the right and left direction will be the directions seen from an operator in a cabin 8 of FIG. 2.

With reference to FIGS. 1 and 2, the upper rotating body 3 is provided with a rotating frame (a base frame) 6 rotatably mounted on the lower traveling body 2, a working attachment 7 mounted in the above rotating frame 6 so as to be raised and lowered, and the cabin 8 mounted in a front part of the rotating frame 6.

The rotating frame 6 is provided with a pair of right and left vertical plates 9 and 10 disposed at substantially center positions in the right and left direction. The above vertical plates 9 and 10 pivotally support a boom 14 of the working attachment 7 arranged between front parts of the vertical plates 9 and 10 with a boom foot pin 11 passing through the vertical plates 9 and 10 and the boom 14 in the left and right direction.

The working attachment 7 is provided with the boom 14, an arm 15 swingably and pivotally supported on a front end of the above boom 14, and a bucket 16 swingably and pivotally supported on a front end of the above arm 15. The boom 14 is raised and lowered relative to the rotating frame 6 in accordance with expansion and contraction of a boom cylinder 17 mounted between the boom 14 and the rotating frame 6. The arm 15 is swung relative to the boom 14 in accordance with expansion and contraction of an arm cylinder 18 mounted between the arm 15 and the boom 14. The bucket 16 is swung relative to the arm 15 in accordance with expansion and contraction of a bucket cylinder 19 mounted between the bucket 16 and the arm 15.

Figure 3:
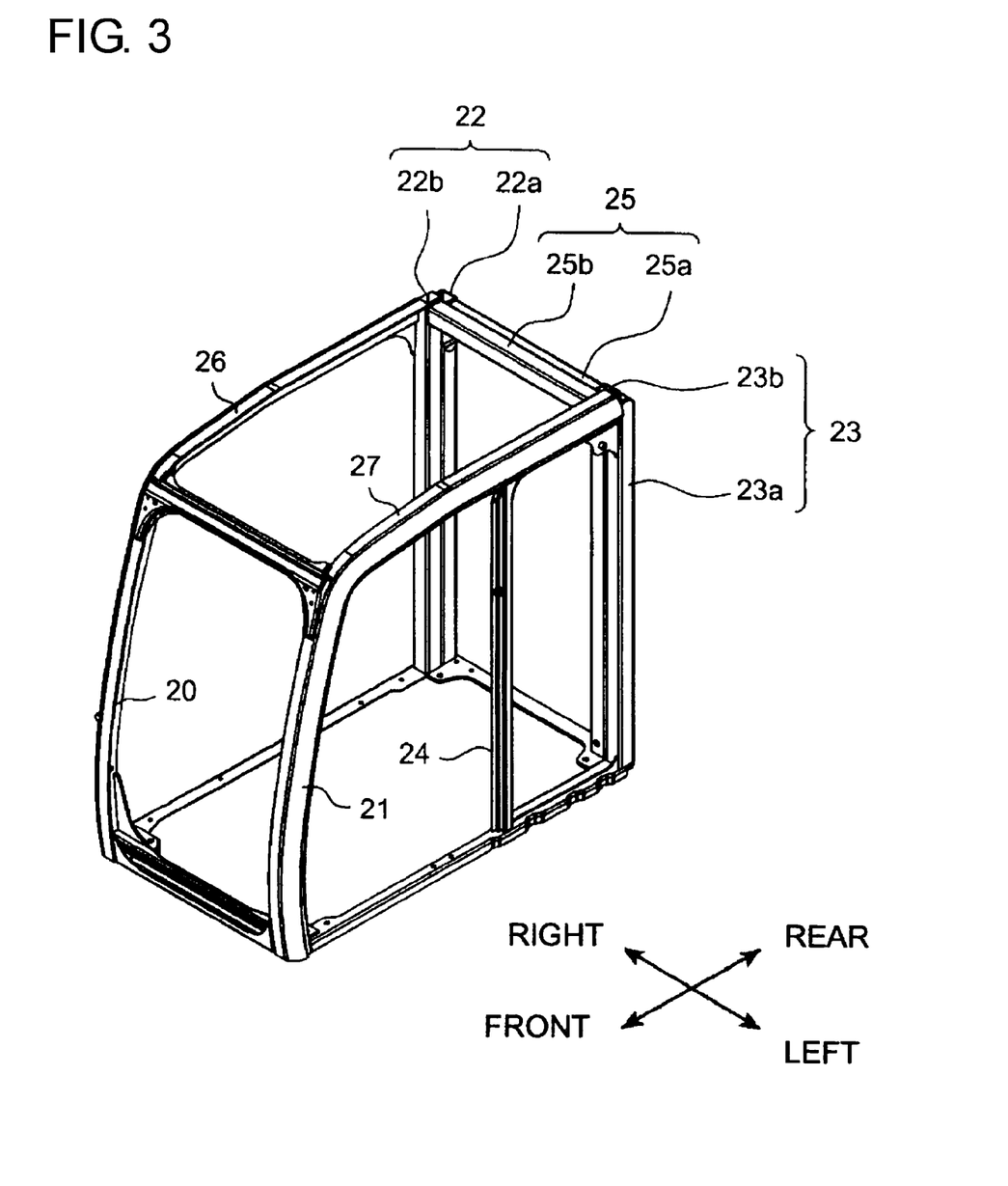
FIG. 3 is a perspective view of a frame structure of a cabin shown in FIG. 2 seen from the front side.
Figure 4:
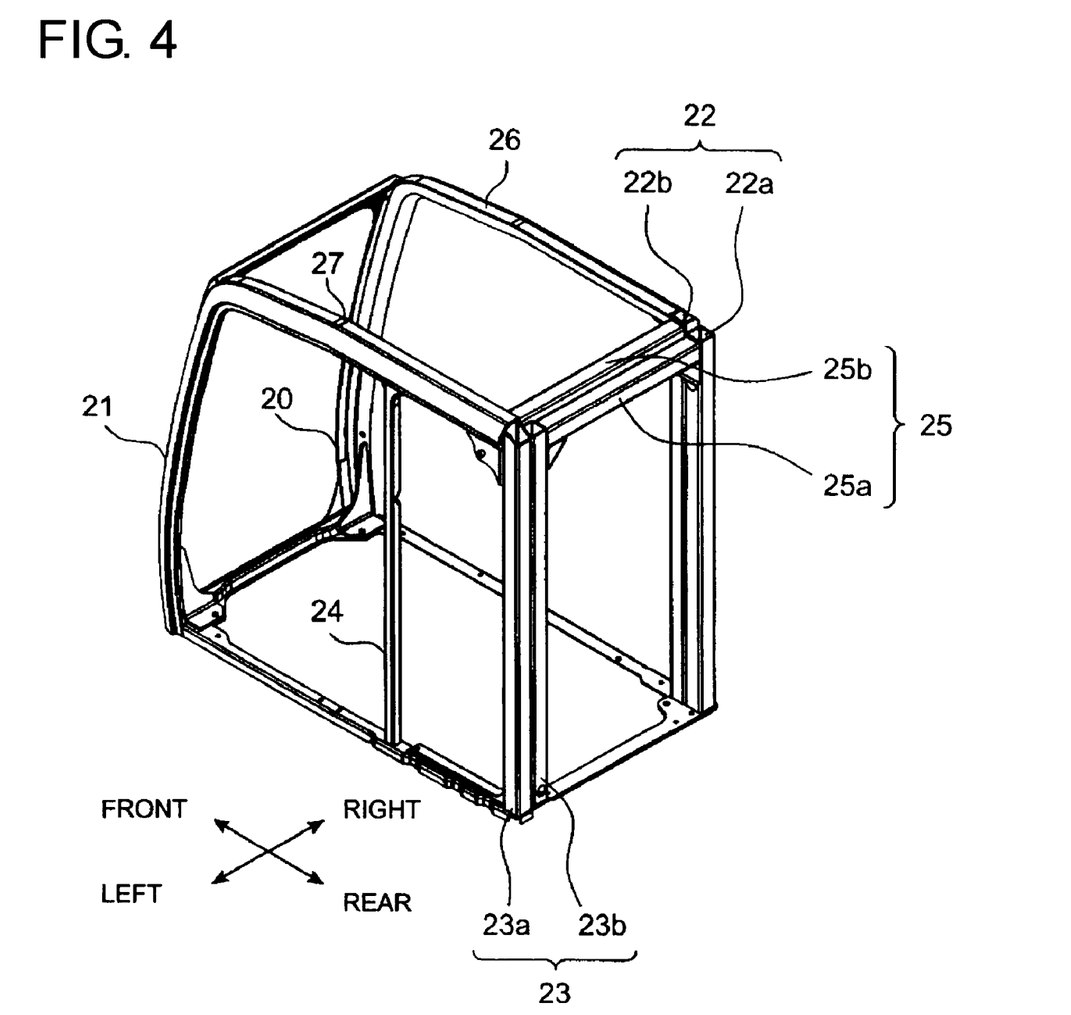
FIG. 4 is a perspective view of the frame structure of the cabin shown in FIG. 2 seen from the rear side.

The cabin 8 is mounted at the left side of the vertical plates 9 and 10 in a front part of the rotating frame 6. As shown in FIGS. 3 and 4, the above cabin 8 has a frame structure including a plurality of supports disposed on the rotating frame 6 and beams for coupling the above supports.

FIG. 3 is a perspective view of the frame structure of the cabin 8 shown in FIG. 2 seen from the front side. FIG. 4 is a perspective view of the frame structure of the cabin 8 shown in FIG. 2 seen from the rear side.

With reference to FIGS. 3 and 4, the cabin 8 is provided with a pair of right front support 20 and left front support 21 disposed on the rotating frame 6, a right rear support 22 disposed in the rear of the right front support 20, a left rear support 23 disposed in the rear of the left front support 21, an intermediate support 24 disposed between the left front support 21 and the left rear support 23, a rear beam 25 for coupling upper parts of the right and left rear supports 22 and 23, a right beam 26 for coupling an upper end of the right front support 20 and an upper end of the right rear support 22, and a left beam 27 for coupling an upper end of the left front support 21 and an upper end of the left rear support 23.

The supports 20 to 24 are respectively formed by a hollow metal tube. In the present embodiment, the right beam 26 is provided as a part formed by bending an upper part of the right front support 20 so as to extend to the rear side, and a rear end thereof is welded to the upper part of the right rear support 22. Similarly, the left beam 27 is provided as a part formed by bending the upper part of the left front support 21 so as to extend to the rear side, and a rear end thereof is welded to the upper part of the left rear support 23. An upper end surface of the intermediate support 24 is welded to a lower surface of a middle part of the above left beam 27.

Figure 5:
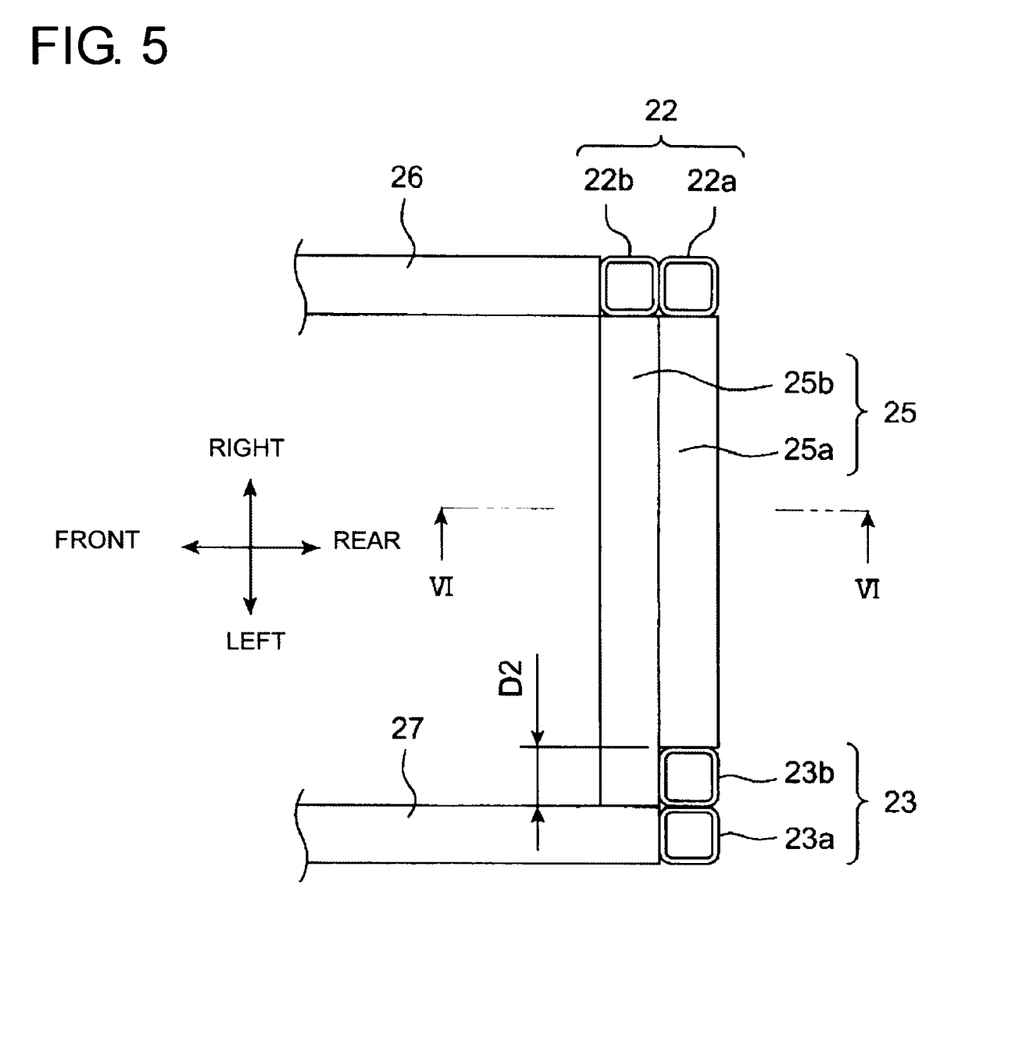
FIG. 5 is an enlarged plan view showing rear supports and a rear beam of FIG. 3.
Figure 6:
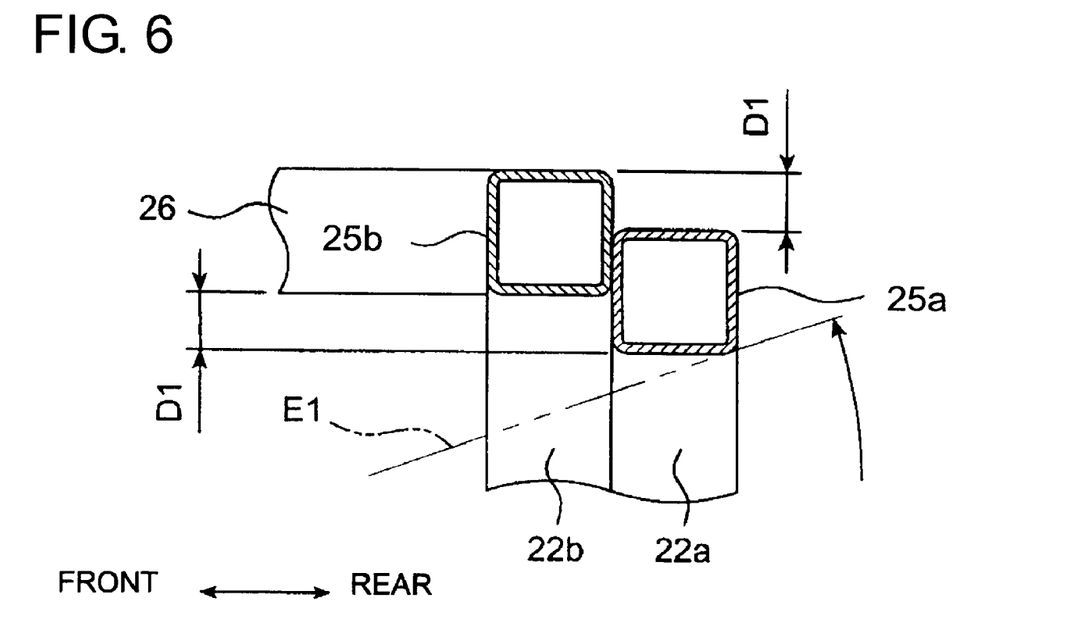
FIG. 6 is a sectional view taken from line VI-VI of FIG. 5.

FIG. 5 is an enlarged plan view showing the rear supports 22 and 23 and the rear beam 25 of FIG. 3. FIG. 6 is a sectional view taken from line VI-VI of FIG. 5.

With reference to FIGS. 3 to 6, the right rear support 22 is provided with a right first support 22a and a right second support 22b disposed at the front side of the above right first support 22a. The right first support 22a and the right second support 22b are respectively formed by a metal tube with a substantially square section. The right second support 22b is formed so as to be higher than the right first support 22a by a dimension D1 (refer to FIG. 6). Both the supports 22a and 22b are welded to each other along the up and down direction in a state that a forward flat surface of the right first support 22a and a rearward flat surface of the right second support 22b are closely adhered to each other. Therefore, since the section of the right rear support 22 is increased in the front and rear direction, the right rear support 22 has resistance against bending in the front and rear direction. A rear part of the right beam 26 is butt-welded to a forward flat surface of the right second support 22b.

The left rear support 23 is provided with a left first support 23a and a left second support 23b disposed at the right side of the above left first support 23a. The left first support 23a and the left second support 23b are respectively formed by a metal tube with a substantially square section. Both the supports 23a and 23b have substantially similar height. Both the supports 23a and 23b are welded to each other in a state that a leftward flat surface of the left second support 23b is closely adhered to a rightward flat surface of the left first support 23a. Therefore, since the section of the left rear support 23 is increased in the right and left direction, the left rear support 23 has the resistance against the bending in the right and left direction. A rear part of the left beam 27 is butt-welded to a forward flat surface of the left first support 23a.

The rear beam 25 is provided with a first beam 25a with both ends welded to the right first support 22a and the left second support 23b, and a second beam 25b with both ends welded to the right second support 22b and the left beam 27. The beams 25a and 25b are formed by substantially-similar-sized metal tubes with square sections respectively. As shown in FIG. 6, the beams 25a and 25b are welded to each other along the longitudinal direction (the left and right direction) in a state that a forward flat surface of the first beam 25a and a rearward flat surface of the second beam 25b are closely adhered to each other.

Specifically, the first beam 25a and the second beam 25b are welded to each other so that an upper surface of the second beam 25b is above an upper surface of the first beam 25a and a lower surface of the second beam 25b is above a lower surface of the first beam 25a. In the present embodiment, as shown in FIG. 6, an upper surface of the right first support 22a and the upper surface of the first beam 25a are matched with each other, an upper surface of the right second support 22b and the upper surface of the second beam 25b are matched with each other, and the sections of the beams 25a and 25b are similar to each other. Therefore, the upper surface and the lower surface of the second beam 25b are arranged above the upper surface and the lower surface of the first beam 25a by a distance D1 respectively.

As mentioned above, in the present embodiment, since the second beam 25b is provided at the front side and above the first beam 25a, it is possible to prevent the second beam 25b getting into sight of the operator in the cabin 8 when the operator looks at the rear side. Therefore, it is possible to enhance the cabin 8 while maintaining favorable sight on the rear side. That is, an upward sight line E1 to the rear side of the operator positioned below the first beam 25a has an upward inclination toward the rear side as shown in FIG. 6, and an upper limit of the sight line is regulated by a lower end portion of the first beam 25a. However, in the present embodiment, the second beam 25b is provided at the front side and at the same time above the first beam 25a. Therefore, the second beam 25b is arranged at a position above the sight line E1 of the operator, and hence the second beam 25b does not get into the sight of the operator. Consequently, according to the above embodiment, it is possible to enhance the cabin 8 while maintaining the favorable sight on the rear side.

As mentioned above, according to the hydraulic excavator 1 of the above embodiment, in a state that the second beam 25b is shifted to above the first beam 25a, the second beam 25b is welded to the front surface of the first beam 25a. Therefore, it is possible to improve the bending strength in the up and down direction and the front and rear direction of the rear beam 25 while suppressing the increase in the weight of the entire rear beam 25. A reason thereof is as follows. It is thought that for example a sectional area of the rear beam 25 perpendicular to the right and left direction is increased evenly (while maintaining a shape thereof to be similar) as means for improving the bending strength of the rear beam 25. However, in such a case, a sectional area of the rear beam 25 for an excessive part which does not contribute to the bending strength in the up and down direction and the front and rear direction is also increased. Therefore, the weight of the rear beam 25 is excessively increased. Meanwhile, in the above embodiment, since the second beam 25b is welded to the front side of the first beam 25a to lengthen the section of the rear beam 25 in the front and rear direction, while the second beam 25b is shifted to and arranged above the first beam 25a to lengthen the section of the rear beam 25 also in the up and down direction, it is possible to improve the bending strength of the rear beam 25 in the up and down direction and the front and rear direction without wastefully increasing the weight of the rear beam 25.

In the above embodiment, since the second beam 25b is directly welded to the first beam 25a for coupling the right and left rear supports 22 and 23 to each other, loads imposed on the right and left rear supports 22 and 23 can be received by both the first beam 25a and the second beam 25b. Therefore, it is possible to enhance the entire cabin 8 without a specific member for coupling the first beam 25a and the second beam 25b in the front and rear direction. By omitting the specific member as described above, it is also possible to suppress the increase in the weight of the cabin 8.

It should be noted that although the description is given to the configuration that the right and left ends of the second beam 25b are respectively welded to the upper part of the right rear support 22 and the rear part of the left beam 27 in the above embodiment, both the ends of the second beam 25b are not limited to be welded to other configuration on the premise that the second beam 25b is welded to the front surface of the first beam 25a. That is, even in the case where both the ends of the second beam 25b are not welded to the right rear support 22 and the left beam 27, by welding the second beam 25b to the first beam 25a as mentioned above, it is possible to improve the bending strength of the rear beam 25 while suppressing the increase in the weight of a machine body.

Meanwhile, in the configuration that the right end of the second beam 25b is welded to the upper part of the right rear support 22 as in the above embodiment, the load imposed on the right rear support 22 can be directly received by the second beam 25b. Therefore, the load can be surely received by both the first beam 25a and the second beam 25b.

It should be noted that although the description is given to the configuration that only the right end of the second beam 25b is welded to the right rear support 22 in the present embodiment, the left rear support 23 may have two front and rear supports as well as the right rear support 22 and the second beam 25b may be welded to one of the supports arranged on the front side. In such a way, it is possible to deal with the load imposed on any of the rear supports 22 and 23 by both the first beam 25a and the second beam 25b.

In the configuration that the right second support 22b is welded to the front surface of the right first support 22a along the up and down direction, the right end of the first beam 25a is welded to the upper part of the right first support 22a and the right end of the second beam 25b is welded to the upper part of the right second support 22b as in the above embodiment, it is possible to enhance the cabin 8 both in the front and rear direction and the right and left direction. That is, the right rear support 22 is formed by welding the right second support 22b to the front surface of the right first support 22a. Therefore, when the entire cabin 8 is inclined in the front and rear direction, the above right rear support 22 effectively functions in the direction so as to prevent such inclination. When the load in the right and left direction is imposed on the cabin 8, the above load can be surely received by the first beam 25a welded to the right first support 22a and the second beam 25b welded to the right second support 22b.

In the configuration that the sections of both the first beam 25a and the second beam 25b, the sections being perpendicular to the right and left direction, are formed into a quadrilateral, and the first beam 25a and the second beam 25b are welded to each other in a state that the forward flat surface of the first beam 25a and the rearward flat surface of the second beam 25b are closely adhered to each other as in the above embodiment, the first beam 25a and the second beam 25b can be welded to each other in a state that the flat surfaces forming quadrilaterals are closely adhered to each other. Therefore, it is possible to sufficiently ensure welding strength and accordingly, sufficiently ensure the bending strength of the entire rear beam 25 as well.

It should be noted that although a quadrilateral is taken as an example in the above embodiment, it is possible to weld the beams while closely adhering the flat surfaces of other polygons. The beams are not limited to have the sections including the flat surfaces but the first beam 25a and the second beam 25b can be formed by a tubular member with a circular section.

In the configuration that the first beam 25a and the second beam 25b are respectively formed by a tubular member extending in the right and left direction as in the above embodiment, hollow tubular members are adopted as the first beam 25a and the second beam 25b so as to reduce the weight, and also improve the strength of the rear beam 25 more than the case where a tubular member only with a large section is adopted as the entire rear beam. That is, unlike the tubular rear beam having an outside dimension corresponding to the section of the rear beam 25 after welding the first beam 25a and the second beam 25b, since the rear beam 25 in which two tubular members of the first beam 25a and the second beam 25b are welded to each other as in the above embodiment has a wall in an intermediate part thereof, it is possible to realize the rear beam 25 with high strength.

It should be noted that as shown in FIG. 5, length of the first beam 25a in the above embodiment is shorter than length of the second beam 25b by an amount of the left second support 23b (a dimension D2). Therefore, when the second beam 25b is formed by combining the first beam 25a with a spacer having a length of the dimension D2, it is possible to use a common metal tube for the first beam 25a and the second beam 25b.

Although the invention has been described with reference to the preferred embodiments in the attached figures, it is noted that equivalents may be employed and substitutions made herein without departing from the scope of the invention as recited in the claims.

We claim:

1. A cabin provided for a base frame of an upper body mounted on a lower self-traveling body of a construction machine, comprising:
 a pair of right and left front supports disposed on the base frame;
 a right rear support disposed in the rear of said right front support on the base frame;
 a left rear support disposed in the rear of said left front support on the base frame;
 a right beam for coupling an upper part of said right front support and an upper part of said right rear support;

a left beam for coupling an upper part of said left front support and an upper part of said left rear support; and a rear beam for coupling the upper parts of said right and left rear supports, wherein said rear beam has a first beam with right and left ends welded to said right and left rear supports respectively, and a second beam having a rear surface welded to a front surface of said first beam over the entire length of said first beam along the right and left direction, said second beam is welded to said first beam so that an upper end portion of said second beam is above an upper end portion of said first beam and a lower end portion of said second beam is above a lower end portion of said first beam, said first beam and said second beam are respectively formed by a tubular member extending in the right and left direction, and said second beam is welded to said first beam so that an upper portion of said rear surface of said second beam is above said front surface of said first beam and a lower portion of said front surface of said first beam is below said rear surface of said second beam.

2. The cabin according to claim 1, wherein at least one of right and left ends of said second beam is welded to said rear support arranged at a side position corresponding to said at least one end.

3. The cabin according to claim 2, wherein at least one of said right and left rear supports is provided with a first support welded to the end of said first beam, and a second support welded to a front surface of said first support along the up and down direction, at least one of the right and left ends of said first beam is welded to an upper part of said first support, and at least one of the right and left ends of said second beam is welded to an upper part of said second support.

4. The cabin according to claim 1, wherein sections of said first beam and said second beam, said sections being perpendicular to the right and left direction, are respectively formed into a quadrilateral, and said first beam and said second beam are welded to each other in a state that a forward flat surface of said first beam and a rearward flat surface of said second beam are closely adhered to each other.

5. The cabin according to claim 1, wherein length in the right and left direction and a section perpendicular to the right and left direction of said first beam are respectively set to be the same as length in the right and left direction and a section perpendicular to the right and left direction of said second beam.

6. A traveling construction machine, comprising:

a lower self-traveling body;

an upper body provided on said lower traveling body; and the cabin according to claim 1 provided for said upper body.

* * * * *